United States Patent [19]
Inui et al.

[11] Patent Number: 5,815,339
[45] Date of Patent: Sep. 29, 1998

[54] CYLINDER MOTOR APPARATUS

[75] Inventors: Michio Inui; Shuuji Ohmura; Akinobu Koba, all of Saitama-ken, Japan

[73] Assignee: Kabushiki Kaisha Toshiba, Japan

[21] Appl. No.: 734,390

[22] Filed: Oct. 17, 1996

Related U.S. Application Data

[63] Continuation of Ser. No. 626,687, Apr. 2, 1996, abandoned, which is a continuation of Ser. No. 314,506, Sep. 28, 1994, abandoned.

[30] Foreign Application Priority Data

Sep. 28, 1993 [JP] Japan .................................... 5-241659
Dec. 27, 1993 [JP] Japan .................................... 5-331702

[51] Int. Cl.$^6$ ........................................................ G11B 5/52
[52] U.S. Cl. ........................................ 360/85; 360/130.22
[58] Field of Search ........................... 360/99.01, 99.02, 360/99.03, 99.04, 99.05, 98.07, 99.08, 84, 85, 107, 108, 130.22, 130.23, 130.24; 369/264, 266

[56] References Cited

U.S. PATENT DOCUMENTS

| | | | |
|---|---|---|---|
| 4,654,738 | 3/1987 | Kato et al. | 360/108 |
| 4,740,848 | 4/1988 | Schild et al. | 360/84 |
| 4,823,218 | 4/1989 | Ibe et al. | 360/130.24 |
| 4,890,177 | 12/1989 | Katoh et al. | 360/107 |
| 4,972,283 | 11/1990 | Kim | 360/107 |
| 5,028,829 | 7/1991 | Cap et al. | 310/114 |
| 5,359,475 | 10/1994 | Aseere et al. | 360/85 |
| 5,388,015 | 2/1995 | Schandl et al. | 360/84 |

FOREIGN PATENT DOCUMENTS

| | | |
|---|---|---|
| 3625001 | 2/1987 | Germany . |
| 9106954 | 3/1991 | WIPO . |

OTHER PUBLICATIONS

Patent Abstracts of Japan, vol. 11, No. 236 (P–601) Aug. 4, 1987 & JP–A–62 047 896 (Hitachi Ltd.) Mar. 2, 1987.
Patent Abstracts of Japan, vol. 12, No. 465 (E–690) Dec. 7, 1988 & JP–A–63 186 550 (Secoh Giken Inc.) Aug. 2, 1988.

*Primary Examiner*—David L. Ometz
*Attorney, Agent, or Firm*—Cushman Darby & Cushman Intellectual Property Group of Pillsbury Madison & Sutro, LLP

[57] ABSTRACT

A cylinder motor apparatus includes a chassis, a shaft, a circuit board, a supporting member for supporting the shaft on the chassis in a freely rotatable state, a rotor fixed to the shaft, which has a stator housing having a circular, concave shape facing in a direction away from the supporting member and a magnet provided in the stator housing, a stator housed in the stator housing and fixed to the circuit board, and an electric circuit provided on the circuit board for controlling the rotation of the rotor.

15 Claims, 8 Drawing Sheets

CYLINDER MOTOR APPARATUS

This is a division of application Ser. No. 08/626,687, filed on Apr. 2, 1996, which was abandoned upon filling hereof which was a continuation of application Ser. No. 08/314,506 filed Sep. 28, 1994, now abandoned.

FIELD OF THE INVENTION

The present invention generally relates to a cylinder motor apparatus which rotates a rotating member by utilizing a rotor and a stator, and more particularly to a magnetic recording or reproducing apparatus utilizing the cylinder motor apparatus.

BACKGROUND OF THE INVENTION

In recent years, magnetic recording or reproducing apparatus such as video tape recorders, digital audio tape recorders, etc., for recording or reproducing on or from magnetic tapes through rotary heads have come into wide use in homes at a rapid speed. To address demands for low-profile equipment, there are some systems which use a cylinder motor apparatus to rotate a rotor mounted to the rotary head shaft of the cylinder with a fixed stator core assembly.

FIG. 1 shows a cross-sectional view illustrating a conventional cylinder motor apparatus and its peripheral members.

In FIG. 1, reference numeral 51 denotes a chassis. On the chassis 51, there is defined a hole 52 into which a cylinder motor apparatus 61 is inserted.

On one side of the chassis 51, a cylinder 54 is mounted by a fastener 53 at a predetermined angle. A through-hole 55 is defined through the center of the cylinder 54. A shaft 56 with a rotary head mounted on its one end is inserted into the through-hole 55 from one end of the cylinder 54. A ball bearing 57 is provided between the inner surface of the through-hole 55 so that the shaft 56 is able to rotate against the cylinder 54 at a low load condition.

There is a step 58 provided at the other end of the cylinder 54. The outer cylindrical wall of the step 58 is fit into a central opening of a cylinder-contained circuit board 62, while the flat surface of the step 58 is in contact with the one side of the cylinder-contained circuit board 62 at a portion around the central opening. There is a stator core assembly 64 provided on the other side of the cylinder-contained circuit board 62 via a spacer 63. The stator core assembly 64, the spacer 63 and the cylinder-contained circuit board 62 are fixed around the step 58 of the cylinder 54 by screws 65. A coil 66 is wound around the stator core assembly 64.

At the other end of the shaft 56, a rotor 67 is mounted. The rotor 67 is provided on its one side with an edge 68 which encircles the stator core assembly 64. A magnet 69 is mounted on a predetermined position of the edge 68. The magnet 69 has such a shape that a notch 70 fits to the edge 68 so as a magnetic field being generated over the inside and the outside of the edge 68. A circular fastener 71 is provided around the shaft 56 on one side of the rotor 67 to stably hold the rotor 67 against the shaft 56. A rotation detecting sensor 72 is provided on the other side of the cylinder-contained circuit board 62. The rotation detecting sensor 72 detects the rotation of the rotor 67 by detecting the magnetic field generated by the magnet 69.

The cylinder motor apparatus 61 is thus constituted by such a structural arrangement of the cylinder-contained circuit board 62, the spacer 63, the stator core assembly 64, the screw 65, the coil 66, the rotor 67, the magnet 69, the circular fastener 71 and the rotation detecting sensor 72, as described above.

There is a main circuit board 81 provided, spaced apart by a predetermined distance from the other side of the chassis 51.

The main circuit board 81 had an opening 82 into which the rotor 67 and the shaft 67 are to be inserted.

A connector 73 is provided at the corner of the other side of the cylinder-contained circuit board 62. Also, another connector 83 is provided beside the opening 82 on the main circuit board 81. The connector 83 is then electrically connected to the connector 73 through a lead 84.

In such a conventional cylinder motor apparatus, when the shaft 56 is rotated as described above, a power supply voltage applied to the main circuit board 81 is led to the cylinder-contained circuit board 62 through the lead 84. Thus, a current is supplied to the coil 66 and thus a rotating magnetic field is applied to the magnet 69 to generate a rotating force for rotating the rotor 67 and the shaft 56. The rotation of the rotor 67 is detected by the rotation detecting sensor 72. A detected signal resulted by the detection of the rotation of the rotor 67 is fed back to the main circuit board 81 through the lead 84. The main circuit board 81 regulates the power supply voltage applied thereto, based on the detection signal to keep the rotation of the rotor 67 constant.

According to such a conventional cylinder motor apparatus, since it is necessary to provide the cylinder-contained circuit board 62 in addition to the main circuit board 81 and in order to fasten the cylinder-contained circuit board 62 to the cylinder 54 by a screw, manufacturing processes and parts count increase. Furthermore, connectors and leads will be also needed to electrically connect the main circuit board 81 and the cylinder-contained circuit board 62 and also operations for connecting these circuit components will be needed. As a result, it is difficult to reduce the manufacturing cost.

In the conventional cylinder motor apparatus, it is difficult to reduce the manufacturing cost, due to the fastening of the cylinder-contained circuit board and the electrical connection between the main circuit board and the cylinder-contained circuit board, as the cylinder-contained circuit board is provided in addition to the main circuit board. In addition, as the stator is mounted between the rotating member and the rotor, the stator and the main circuit board have to be individually mounted to the rotating member, and it is further difficult to reduce the manufacturing cost. Furthermore, as the air hardly circulates between the rotor and the stator, under the state of high atmospheric temperature in the summer season, etc., the motor is heated excessively by the current flowing in the stator coil, thus causing defective operation or trouble in some cases.

SUMMARY OF THE INVENTION

It is, therefore, an object of the present invention to provide a cylinder motor apparatus which is capable of rotating a rotor without providing a circuit board in a cylinder.

Another object of the present invention is to provide a cylinder motor apparatus which is capable of mounting both the stator and the main circuit board at a time on the rotating member.

Still another object of the present invention is to provide a cylinder motor apparatus which is capable of improving the air circulation between the rotor and the stator.

Still another object of the present invention is to provide a magnetic recording or reproducing apparatus which utilizes such a cylinder motor apparatus as described above.

In order to achieve the above object, a cylinder motor apparatus according to a first aspect of the present invention includes a chassis, a shaft, a circuit board, a supporting member for supporting the shaft on the chassis in a freely rotatable state, a rotor fixed to the shaft, which has a stator housing defined into a circular depression shape opened in the direction opposite to the supporting member and a magnet provided in the stator housing, a stator housed in the stator housing and fixed to the circuit board, and an electric circuit provided on the circuit board for controlling the rotation of the rotor.

According to the structure of the first aspect of the cylinder motor apparatus as described, it is able to rotate the rotor without providing a circuit board in the cylinder, as the stator is mounted on the main circuit board.

A cylinder motor apparatus according to a second aspect of the present invention includes a chassis, a shaft, a cylinder for supporting the shaft on the chassis in a freely rotatable state, a rotor fixed to the shaft, which has a stator housing defined into a circular depression shape opened in the direction opposite to the cylinder and a magnet provided in the stator housing, a circuit board provided in parallel with the chassis, a stator housed in the stator housing and fixed to the circuit board, and an electric circuit provided on the circuit board for controlling the rotation of the rotor.

According to the structure of the second aspect of the motor apparatus as described above, it is able to mount the stator and the main circuit board collectively at a time on the rotating member side as the stator is provided on the surface of the main circuit board opposite to the chassis.

A cylinder motor apparatus according to a third aspect of the present invention includes a chassis, a shaft, a stationary cylinder for supporting the shaft on the chassis in a freely rotatable state at a predetermined angle from the plane of the chassis, a rotary cylinder for supporting the shaft on the chassis in a freely rotatable state, a rotary cylinder having a magnetic head, which is fixed to the shaft, a tape travel driving system adapted for driving a tape cassette loaded thereto, which includes a reel base, a capstan and a pinch roller, a tape guiding and supporting system provided to the chassis, which includes a tape pull-out member for pulling a tape out of the loaded tape cassette and making the tape contact with the stationary cylinder and the rotary cylinder, a rotor fixed to the shaft, which has a stator housing defined into a circular depression shape opened in the direction opposite to the cylinder and a magnet provided in the stator housing, a circuit board provided in parallel with the chassis at a position opposite to the cylinder in relation to the chassis, a stator housed in the stator housing and fixed to the circuit board, and an electric circuit provided on the circuit board for controlling the rotation of the rotor, the operation of the tape guiding and supporting system, and the recording or reproducing operation of information signals on or from the tape through the magnetic head.

According to the structure of the third aspect of the cylinder motor apparatus as described above, the air circulation between the rotor and the stator can be improved as the through-holes are formed on the depression-shaped bottom of the rotor.

A cylinder motor apparatus according to a fourth aspect of the present invention includes a chassis, a shaft, a circuit board, a cylinder for supporting the shaft on the chassis in a freely rotatable state, a rotor fixed to the shaft, which has a stator housing defined into a circular depression shape opened in the direction opposite to the cylinder and a magnet provided in the stator housing, a stator housed in the stator housing and fixed to the circuit board, and an electric circuit provided on the circuit board for controlling the rotation of the rotor.

According to the structure of the fourth aspect of the cylinder motor apparatus as described above, it is able to rotate the rotor without providing a circuit board in the cylinder, as the stator is mounted on the main circuit board.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The present invention will be described in detail with reference to the FIGS. 2 through 9.

Figure 1:
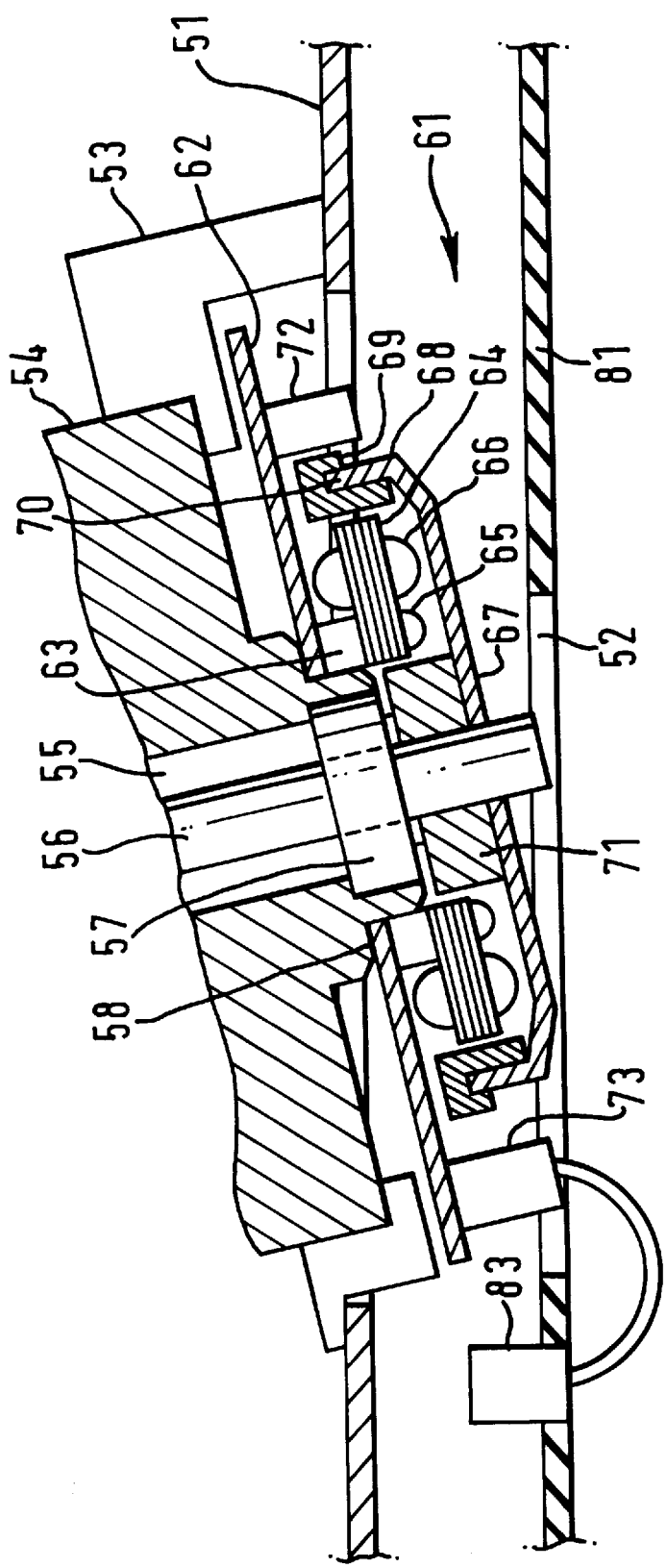
FIG. 1 is a cross-sectional view showing a conventional cylinder motor apparatus.

Throughout the drawings, reference numerals or letters in FIG. 1 will be used to designate like or equivalent elements for simplicity of explanation.

Figure 2:
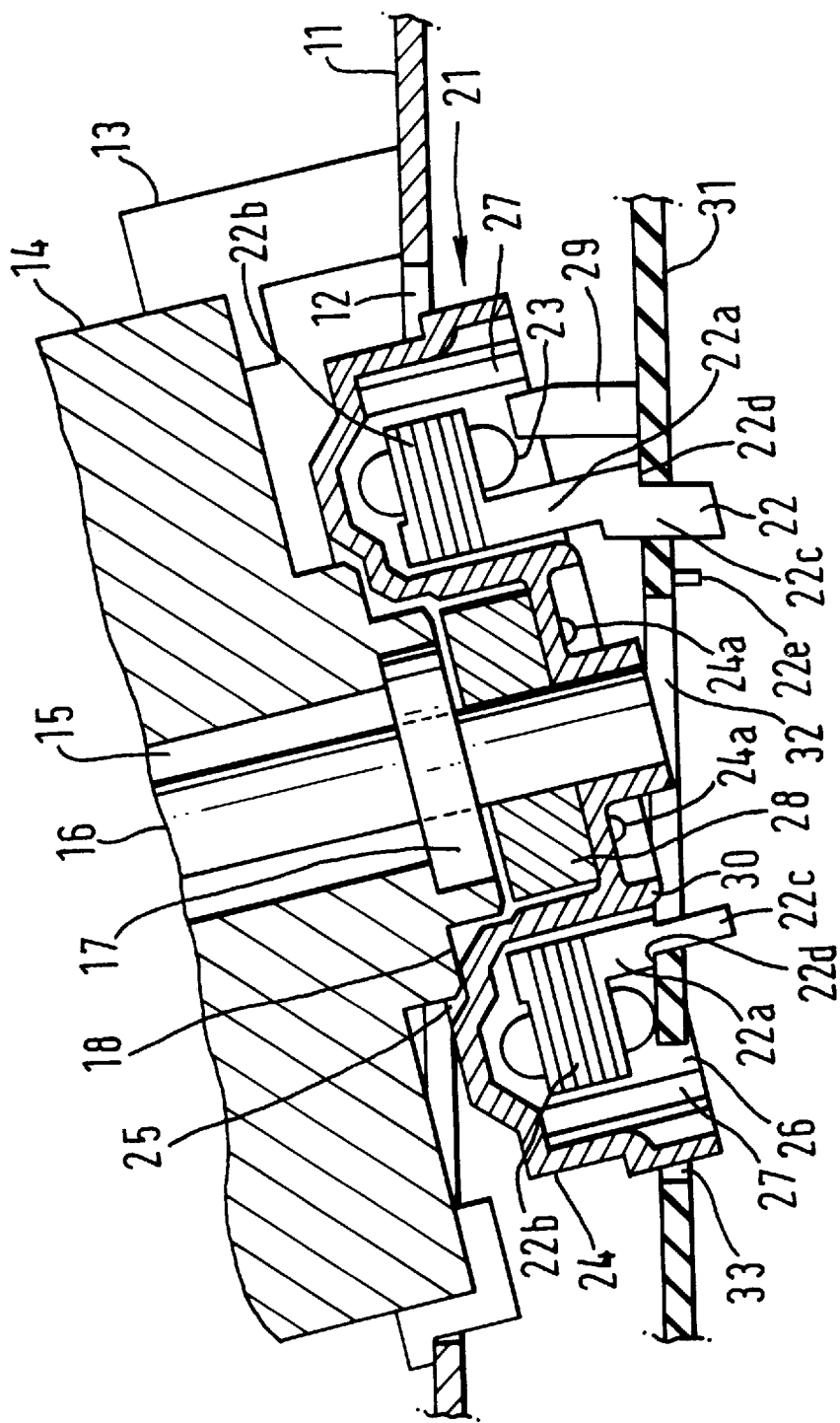
FIG. 2 is a cross-sectional view showing one embodiment of a motor apparatus according to the present invention.

Referring now to FIG. 2, a first embodiment of the cylinder motor apparatus according to the present invention will be described in detail.

FIG. 2 is a cross-sectional view for illustrating the first embodiment of the cylinder motor apparatus according to the present invention.

In FIG. 2, reference numeral 11 denotes a chassis. On the chassis 11, an opening 12 is defined for receiving therein a motor apparatus 21.

A cylinder 14 is mounted on one side of the chassis 11 by a fastener 13 at a predetermined angle. At the center of the cylinder 14, a through-hole 15 is defined. A shaft 16 mounting on its one end a rotary cylinder (not shown) having a magnetic head is inserted into the through-hole 15 from one end of the cylinder 14. Between the inner surface of the through-hole 15 and the shaft 16, a ball bearing 17 is provided. Thus the shaft 16 is rotatable in the cylinder 14 at low load condition. There is also defined a step 18 at the other end of the cylinder 14.

An opening 32 is defined in the main circuit board 31, into which both the inner portion of the rotor 24 and the shaft 16 are inserted, while another opening 33 into which the outer portion of the rotor 24 is inserted is also defined on the main circuit board 31. On one side of the main circuit board 31, a stator core assembly 22 is provided at the angle the same as the cylinder 14. The stator core assembly 22 has a structure that plural cores 22b are laminated in one body on one end of a cylindrical member 22a along the axis of the cylindrical member 22a. The other end of the cylindrical member 22a is partially cut out at a bevel for its axis, while legs 22c extend axially from the other end of the cylindrical member 22a for mounting the main circuit board 31. The legs 22c have different lengths and some of the legs 22c are vertically aligned to the main circuit board 31. The stator core assembly 22 is mounted to the main circuit board 31 at the angle the same as the cylinder 14 by fixing the legs 22c to the main circuit board 31 so that the other end of the cylindrical member 22a is fit to the one side of the main circuit board 31. Further, a coil 23 is wound around the core 22b of the stator core assembly 22 and a plurality of lead terminals 22e for the coil 23 are provided to the cylindrical member 22a to project in the direction the same as the circuit board mounting legs 22c. The terminals 22e are inserted into inserting holes of the main circuit board 31 in the assembling process of the stator core assembly 22 to the main circuit board 31 so that the coil 23 and the main circuit board 31 are electrically connected each other.

At the other end of the shaft 16, the rotor 24 is mounted. The rotor 24 which is molded from a thermoplastic material has defined at one end a depression 25 which fits with the step 18, and a circular depression 26 which receives therein the stator core assembly 22 on its other end. A circular magnet 27 is mounted in the circular depression 26 at a predetermined position facing the stator core assembly 22. The circular magnet 27 generates a magnetic field in the circular depression 26. The rotor 24 is so arranged that its central portion is laid inside the cylindrical member of the stator core assembly 22. Further, the inner wall of the depression 25 of the rotor 24 is provided with a projection 30 which extends in the axial direction from the end of the inner wall. When assembling the main circuit board 31 with the stator core assembly 22 mounted to position the stator core assembly 22 in the depression 25 of the rotor 24, the projection 30 is first brought in contact with the cylindrical inner wall in acting as a guide for the inserting and assembling processes. A circular supporter 28 is fit on the shaft 16 within the depression 25 of the rotor 24. The rotor 24 is stably secured to the circular supporter 28 by a screw 24a so as that the rotor 24 rotates in conjunction with the shaft 16. At the position close to the circular magnet 27 on the one side of the main circuit board 31, a rotation detecting sensor 29 is provided. The rotation detecting sensor 29 detects the rotation of the rotor 24 by detecting the magnetic field generated by the circular magnet 27.

The cylinder motor apparatus 21 is constituted in the structure as described above by the stator core assembly 22, the coil 23, the rotor 24, the magnet 27, the circular supporter 28 and the rotation detecting sensor 29.

When rotating the shaft 16 of the cylinder motor apparatus 21 embodied as described above, the main circuit board 31 applies a voltage to the coil 23 to supply a current thereto, thus a rotating magnetic field being applied to the magnet 27, and in turn a rotating force for the rotor 24 and the shaft 16 being generated. The rotation of the rotor 24 is detected by the rotation detecting sensor 29 and then the detected signal is fed back to the main circuit board 31. The main circuit board 31 adjusts the current flowing through the coil 23 by regulating the voltage applied to the coil 23 in order to keep the rotation of the rotor 24 constant.

The main circuit board 31 is equipped with such circuit components constituting an electric circuit including a recording or reproducing circuit, servo circuits, control circuits, etc., for video tape recorders in which the cylinder motor apparatus according to the present invention is mounted, and is mounted to the chassis 11.

According to the first embodiment of the present invention, the cylinder motor apparatus is able to rotate the rotor without providing a circuit board in the cylinder, thus the manufacturing cost of the cylinder motor apparatus being reduced.

Figure 3:
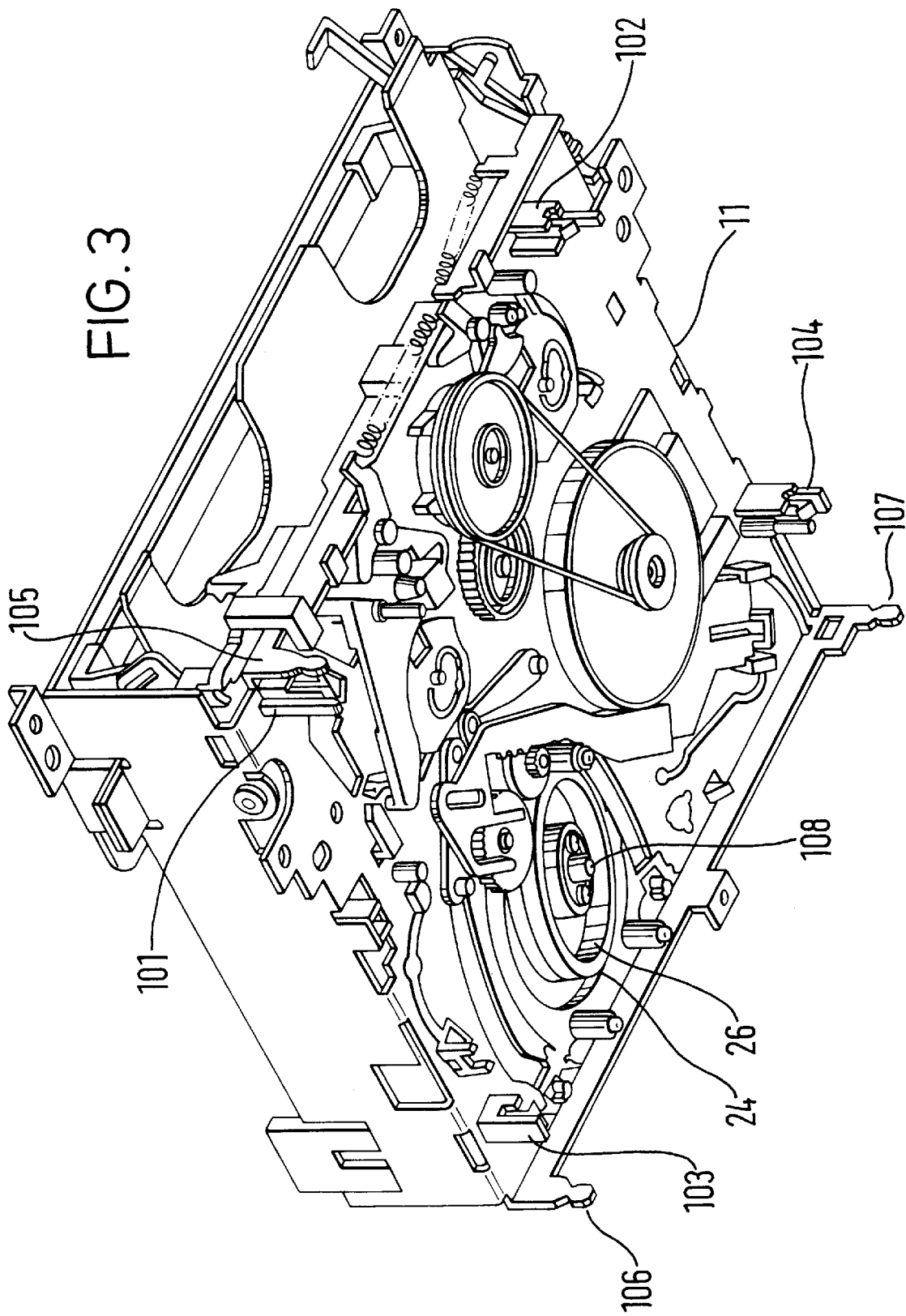
FIG. 3 is a perspective bottom view of the chassis of FIG. 2.

FIG. 3 shows a perspective bottom view for illustrating the entirety of the chassis 11.

On the bottom surface of the chassis 11, the rotor 24 is mounted in facing its circular depression 26 to the stator core assembly 22. Further, catches 101, 102, 103 and 104 are provided around four corners of the bottom surface of the chassis 11. At the lower left of the front of the chassis 11, a positioning projection 105 is provided. On the lower left and right of the back of the chassis 11, positioning projections 106 and 107 are provided. In addition, a screw clamping part 108 is provided on the side of the rotor 24.

Figure 4:
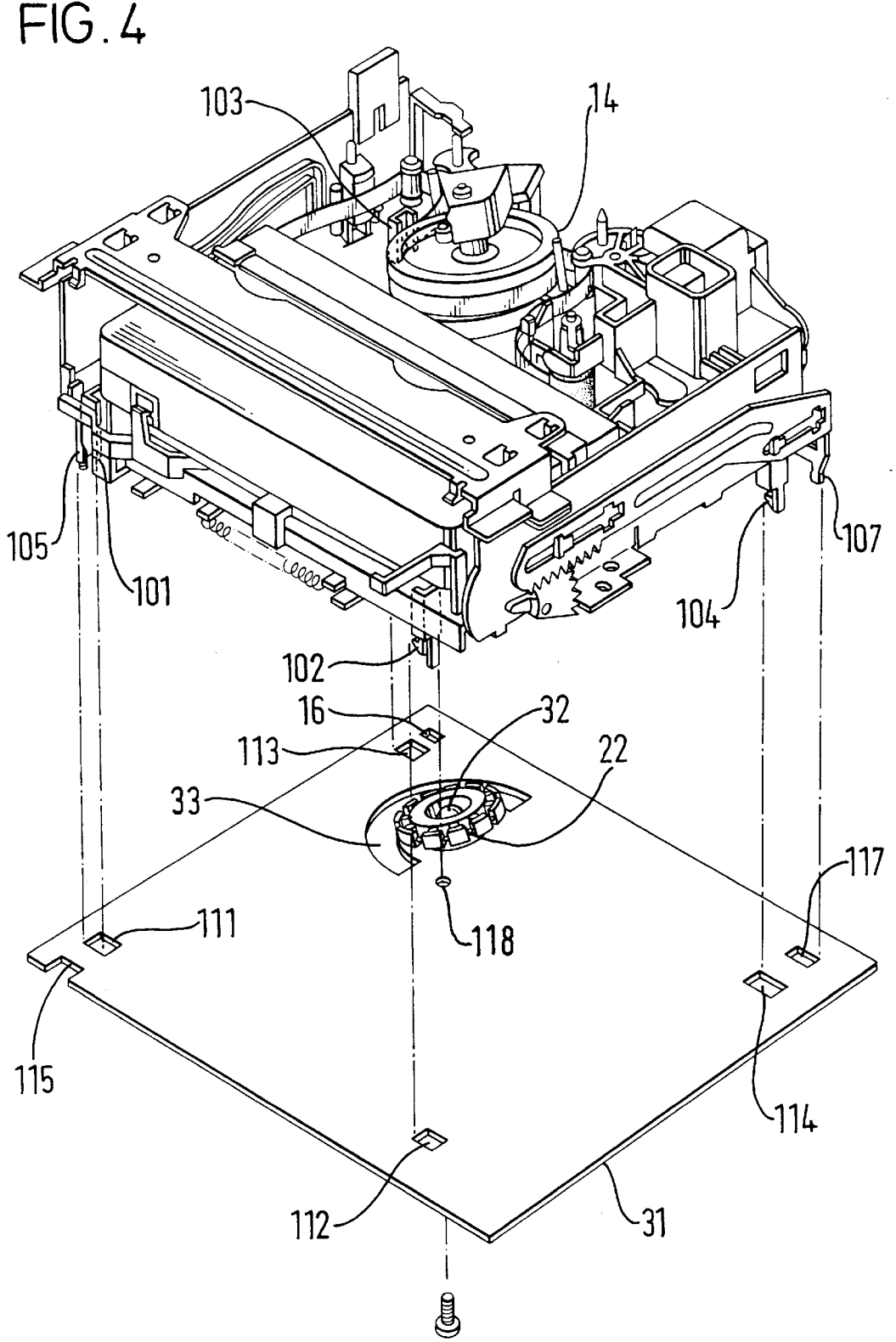
FIG. 4 is an exploded perspective view of a video tape recorder which utilizes the motor apparatus shown in FIG. 2.

FIG. 4 is a exploded perspective view of a video tape recorder which utilizes the cylinder motor apparatus as shown in FIG. 2.

On the main circuit board 31, the opening 32 as shown in FIG. 2 as well as the opening 33 are defined. On the surface facing to the chassis 11 of the main circuit board 31, the stator core assembly 22 is provided at the angle the same as the cylinder 14.

Further, on the main circuit board 31, there are defined through-holes 111, 112, 113 and 114 in which the catches 101, 102, 103 and 104 are caught, a positioning notch 115 into which the positioning projection 105 is inserted and positioning through-holes 116 and 117 into which positioning projections 106 and 107 (see FIG. 3) are inserted. Further, a through-hole 118 through which a screw 110 is inserted into a screw clamping part 108 is defined on the main circuit board 31.

When assembling these chassis 11 and the main circuit board 31, they are combined together by inserting the positioning projection 105 into the positioning notch 115 and the positioning projections 106 and 107 into the positioning through-holes 116 and 117, respectively. Thus, the stator core assembly 22 is inserted into the circular depression 26 of the rotor 24 and at the same time, the catches 101, 102, 103 and 104 are inserted into and caught by the through-holes 111, 112, 113 and 114. Thereafter, the chassis 11 and the main circuit board 31 are completely fixed by inserting the screw 110 into the through-hole 118 and screwing into the screw clamping part 108.

By combining the chassis 11 and the main circuit board 31 together as described above, it becomes possible to mount the stator core assembly 22 and the main circuit board 31 collectively at a time on the cylinder 14 and to reduce the manufacturing cost by simplifying the manufacturing processes.

Figure 5:
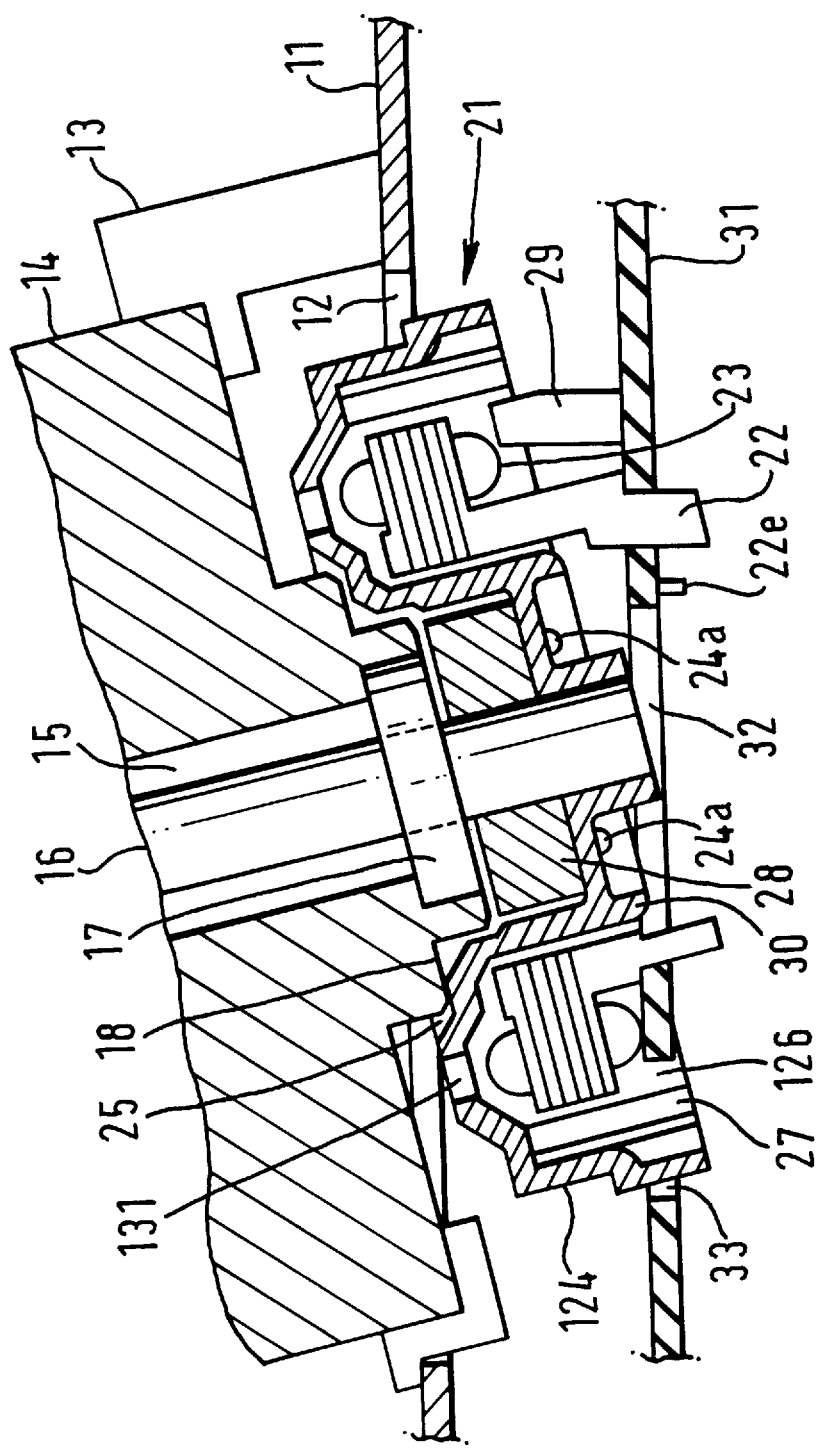
FIG. 5 is a cross-sectional view showing another embodiment of the motor apparatus according to the present invention.

FIG. 5 shows a cross-sectional view for illustrating another embodiment of the motor apparatus according to the present invention. In the embodiment of FIG. 5, the same components as the embodiment shown in FIG. 2 are assigned with the same reference numerals, and then omitted their explanations hereinafter.

On the bottom of a circular depression 126 of a rotor 124, through-holes 131 are formed to circulate air in the space between the rotor 124 and the stator core assembly 22 to the outside. Here in FIG. 6 the circular magnet 127 is represented by three coaxial broken lines.

Figure 6:
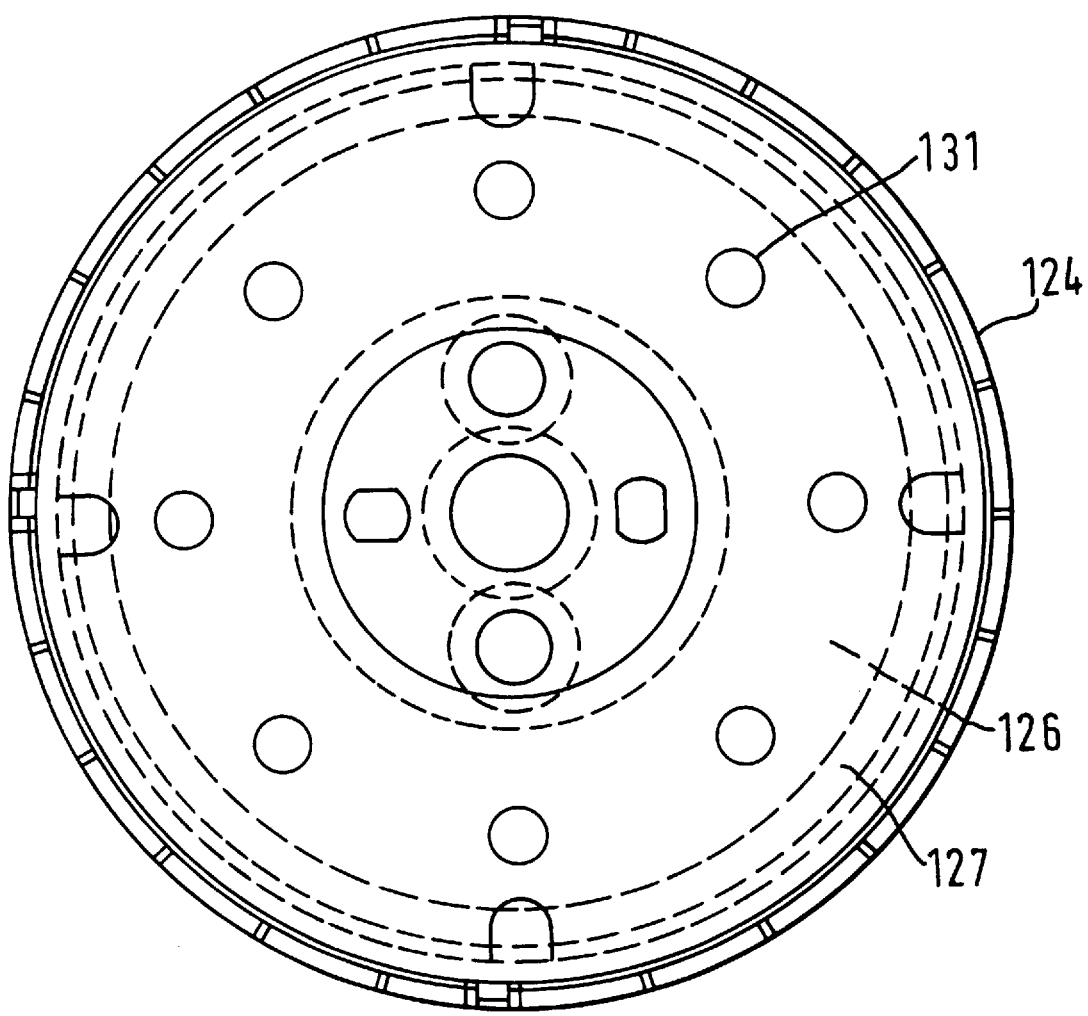
FIG. 6 is a plan view showing the rotor of FIG. 5.

FIG. 6 shows a plan view for illustrating the rotor 124 shown in FIG. 5.

On the bottom of a circular depression 126 of the rotor 124, eight through-holes 131 are formed along the circumferential direction.

According to the embodiment, the same effects as in the embodiment shown in FIG. 2 are obtained, and furthermore air circulates between the rotor 124 and the stator core assembly 22 through the through-hole 131, it is able to prevent the motor from being heated by the current flowing to the coil 23 of the stator core assembly 22 under the high atmospheric temperature in the summer season and thus, preventing defective operations and troubles.

Figure 7:
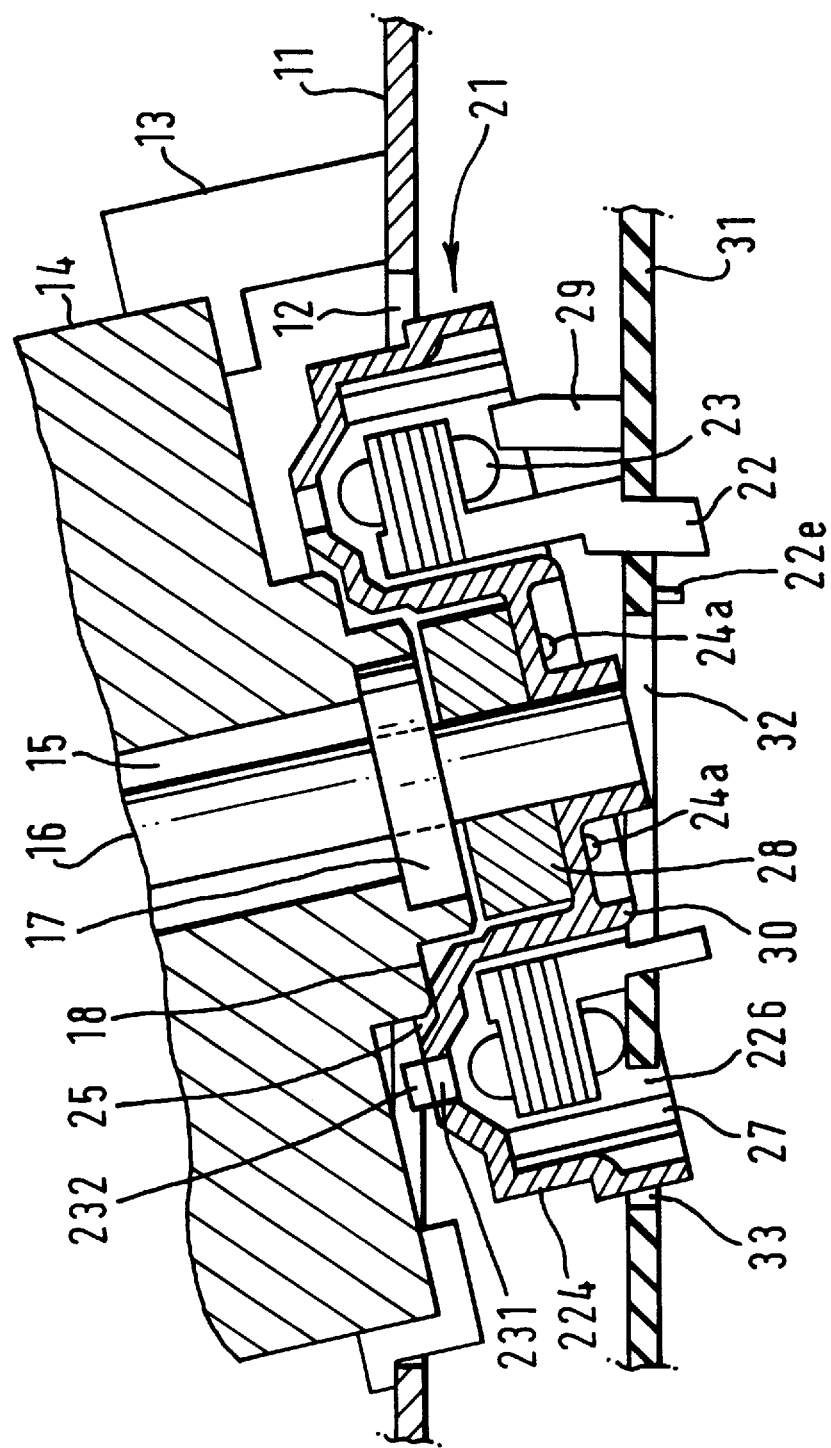
FIG. 7 is a cross-sectional view showing still another embodiment of the motor apparatus according to the present invention.

FIG. 7 shows still another embodiment of the motor apparatus according to the present invention. In the embodiment of FIG. 7, the same components as the embodiments shown in FIGS. 2 and 5 are assigned with the same reference numerals, and then omitted their explanations hereinafter.

On the bottom of a circular depression 226 of a rotor 224, through-holes 231 are formed to circulate air in the space between the rotor 224 and the stator core assembly 22 to the outside. At the outside of each through-hole 231, a vane 232 is formed to suck air into the through-hole 231 during the rotation of the rotor 224.

Figure 8:
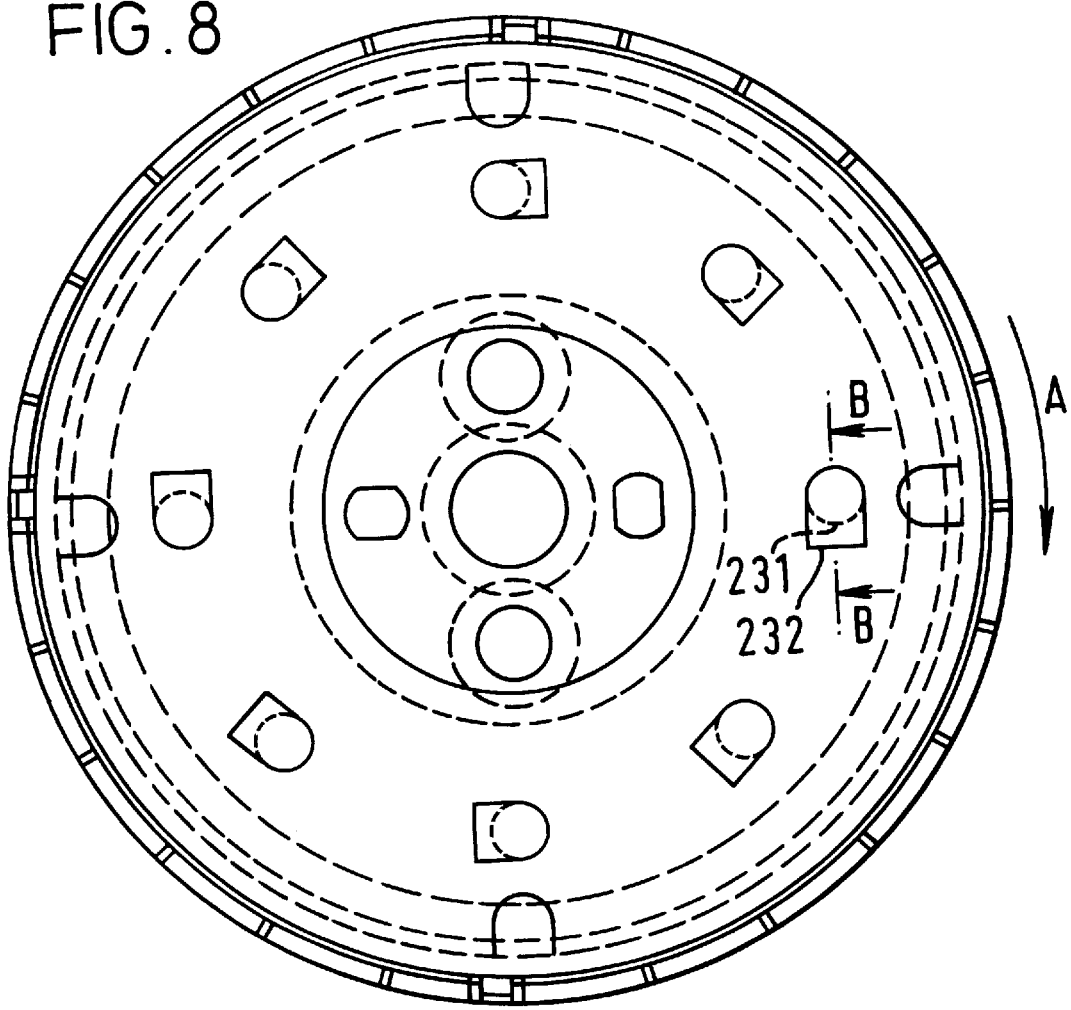
FIG. 8 is a plan view showing the rotor of FIG. 7.

FIG. 8 shows a plan view for illustrating the rotor 224 shown in FIG. 7.

On the bottom of the circular depression 226 of the rotor 224, eight through-holes 231 are formed along the circumferential direction. At the outside of eight through-holes 231, eight vanes 232 are formed facing to the rotating direction A of the rotor 224.

Figure 9:
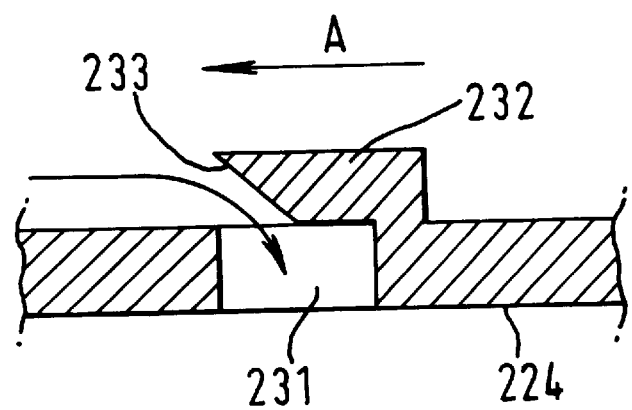
FIG. 9 is a partial cross-sectional view of the rotor at the line B—B in FIG. 8.

FIG. 9 shows a partial cross-sectional view of the portion around the through-hole 231 and the vane 232 at the line B—B in FIG. 8.

In FIG. 9, an inclined surface 233 is provided beside the rotating direction A of each vane 232 to suck air into the through-hole 232 in the aid of the inclined surface 233 during the rotation of the rotor 224.

According to the embodiment, the same effects as the embodiment shown in FIG. 6 are obtained, and furthermore air is led into the through-holes 231 by the vanes 232, it is able to cool down the coil 23 of the stator core assembly 22 to improve the cooling effect higher than the embodiment shown in FIG. 6.

The embodiments shown in FIGS. 2 through 9 can be applied to such cylinder motor apparatus of video tape recorders but they are also applicable to motor apparatus for rotating other rotatable members, for instance, capstan motors of video tape recorders, etc.

As described above, according to the present invention, it is able to reduce the manufacturing cost of the motor apparatus, as the rotor can be rotated without a circuit board specifically designed for a rotating member.

Furthermore, as it is able to mount the stator and the main circuit board collectively at a time on the rotating member, the manufacturing cost of the motor apparatus can be reduced.

In addition, as air in the space between the rotor and the stator can be circulated, it is also able to prevent the motor apparatus from being heated caused by the current flowing in the coil of the stator even under the state of high atmospheric temperature in the summer season, etc. and thus preventing defective operations or defects.

As described above, the present invention can provide an extremely preferable cylinder motor apparatus and a magnetic recording or reproducing apparatus which utilizes such a cylinder motor apparatus.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefor, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A cylinder motor apparatus comprising:

a chassis;

a shaft;

a circuit board;

a supporting member for supporting the shaft on the chassis in a freely rotatable state;

a rotor fixed to the shaft wherein the rotor has a stator housing defined into a circular concave shape facing in a direction axially away from the supporting member; a magnet being provided in the stator housing;

the stator housing having an inner circular wall, an outer circular wall coaxial to said inner circular wall and a base wall extending between said inner and outer circular walls and defining therewith said concave shape of the stator housing, said inner and outer walls protecting from the base wall generally axially away from the support member, said inner wall being laterally spaced from said shaft, said stator housing further comprising a projection extending from the inner wall, coaxially with the inner wall, axially beyond the extent of said outer wall;

a stator housed in the stator housing and fixed to the circuit board; and an electric circuit provided on the circuit board for controlling the rotation of the rotor.

2. A cylinder motor apparatus as claimed in claim 1, wherein a through-hole which is aligned at a predetermined angle from the rotating locus of the rotor is defined in the circuit board so that a part of the rotor is rotatably supported in the through-hole.

3. A cylinder motor apparatus as claimed in claim 2, further comprising, a rotating phase detecting sensor provided on the circuit board at a position opposite to the through-hole in relation to the stator.

4. A cylinder motor apparatus as claimed in claim 1, wherein a through-hole is defined in the rotor in the base wall of the stator housing.

5. A cylinder motor apparatus as claimed in claim 4, wherein the rotor is provided with a vane for directing air into the through-hole of the rotor during the rotation of the rotor.

6. A cylinder motor apparatus as in claim 1 wherein said supporting member comprises a cylinder, said shaft being rotatably supported by said cylinder, said cylinder being secured to the chassis.

7. A cylinder motor apparatus comprising:
   a chassis;
   a shaft;
   a supporting member for supporting the shaft on the chassis in a freely rotatable state;
   a rotor fixed to the shaft, wherein the rotor has a stator housing having a cylindrical outer wall and a bottom wall together defined into a circular concave shape facing in a direction axially away from the supporting member, a magnet being provided in the stator housing, at least one ventilation through-hole being defined through the bottom wall of the stator housing, said bottom wall of the stator housing having a vane adjacent each said at least one through-hole for directing air into and through the at least one through-hole during rotating of the rotor;
   a circuit board provided in parallel with the chassis;
   a stator housed in the stator housing and fixed to the circuit board; and
   an electric circuit provided on the circuit board for controlling the rotation of the rotor.

8. A cylinder motor appartus as claimed in claim 7, wherein a circuit board through-hole which is aligned at a predetermined angle from the rotating locus of the rotor is defined in the circuit board so that a part of the rotor is rotatably supported in the circuit board through-hole.

9. A cylinder motor apparatus as claimed in claim 8, further comprising, a rotating phase detecting sensor provided on the circuit board at a position opposite to the circuit board through-hole in relation to the stator.

10. A cylinder motor apparatus as claimed in claim 7, wherein the stator housing has an inner cylindrical wall, coaxial to the outer cylindrical wall and a projection extending from the inner wall in the axial direction axially beyond the extent of the outer wall.

11. A cylinder motor apparatus as in claim 7 wherein said supporting member comprises a cylinder, said shaft being rotatably supported by said cylinder, said cylinder being secured to the chassis.

12. A cylinder motor apparatus comprising:
    a chassis;
    a shaft;
    a stationary supporting member for supporting the shaft on the chassis in a freely rotatable state at a predetermined angle from the plane of the chassis;
    a rotary cylinder having a magnetic head, which is fixed to the shaft;
    a tape travel driving system for driving a tape cassette loaded thereto, wherein said tape travel driving system includes a reel base, a capstan and a pinch roller;
    a tape guiding and supporting system provided to the chassis, which includes a tape pull-out member for pulling a tape out of the loaded tape cassette and making the tape contact with the stationary supporting member and the rotary cylinder;
    a rotor fixed to the shaft, wherein the rotor has a stator housing defined into a circular concave shape facing in a direction axially away from the supporting member and a magnet provided in the stator housing;
    the stator housing having an inner circular wall, an outer circular wall coaxial to said inner circular wall and a base wall extending between said inner and outer circular walls and defining therewith said concave shape of the stator housing, said inner and outer walls projecting from the base wall generally axially away from the support member, said inner wall being laterally spaced from said shaft, said stator housing further comprising a projection extending from the inner wall, coaxially with the inner wall, axially beyond the extent of said outer wall;
    a circuit board provided in parallel with the chassis at a position opposite to the supporting member in relation to the chassis;
    at least one ventilation through-hole being defined through the base wall of the stator housing, said base wall of the stator housing having a vane adjacent each said ventilation through-hole for directing air into and through the ventilation through-hole during rotating of the rotor;
    a stator housed in the stator housing and fixed to the circuit board; and
    an electric circuit provided on the circuit board for controlling the rotation of the rotor, the operation of the tape guiding and supporting system, and the recording or reproducing operation of information signals on or from the tape through the magnetic head.

13. A cylinder motor apparatus as claimed in claim 12, wherein a circuit board through-hole which is aligned at a predetermined angle from the rotating locus of the rotor is defined in the circuit board so that a part of the rotor is rotatably supported in the circuit board through-hole.

14. A cylinder motor apparatus as claimed in claim 13, further comprising, a rotating phase detecting sensor provided on the circuit board at a position opposite to the circuit board through-hole in relation to the stator.

15. A cylinder motor apparatus comprising:
    a chassis;
    a shaft;
    a supporting member for supporting the shaft on the chassis in a freely rotatable state at a predetermined angle from the plane of the chassis;
    a rotary cylinder having a magnetic head, which is fixed to the shaft;
    a tape travel driving system for driving a tape cassette loaded thereto, wherein said tape travel driving system includes a reel base, a capstan and a pinch roller;
    a tape guiding and supporting system provided to the chassis, which includes a tape pull-out member for pulling a tape out of the loaded tape cassette and making the tape contact with the stationary supporting member and the rotary cylinder;
    a rotor fixed to the shaft, wherein the rotor has a stator housing defined into a circular concave shape facing in a direction axially away from the supporting member and a magnet provided in the stator housing;

the stator housing having an inner circular wall, an outer circular wall coaxial to said inner circular wall and a base wall extending between said inner and outer circular walls and defining therewith said concave shape of the stator housing, said inner and outer circular walls projecting from the base wall generally axially away from the supporting member;

a circuit board provided in parallel with the chassis at a position opposite to the supporting member in relation to the chassis, the circuit board covering a substantial part of the chassis and defining a through-hole allowing the rotor to rotatably pass therethrough;

a stator housed in the stator housing and fixed to the circuit board at the predetermined angle of the shaft; and an electric circuit provided on the circuit board for controlling the rotation of the rotor, the operation of the tape guiding and supporting system, and the recording or reproducing operation of information signals on or from the tape through the magnetic head.

* * * * *